United States Patent Office 3,639,522
Patented Feb. 1, 1972

3,639,522
SELF-EXTINGUISHING HIGH IMPACT STYRENE POLYMERS
Munisamappa Narayana and Henno Keskkula, Midland, and Jerry E. Mason, Hemlock, Mich., assignors to The Dow Chemical Company, Midland, Mich.
No Drawing. Filed June 4, 1969, Ser. No. 830,514
Int. Cl. C08f 29/22
U.S. Cl. 260—880 R          3 Claims

ABSTRACT OF THE DISCLOSURE

The disclosure concerns self-extinguishing high impact styrene polymers containing dibromocarbene modified butadiene polymers.

---

This invention concerns self-extinguishing high impact styrene polymers containing dibromocarbene modified butadiene polymers and pertains to a method of making the same.

It is known that the halogen content of halogen compounds often has an effect of reducing the flammability both of the compounds containing the halogen and of other compounds intimately admixed therewith. In general, bromine-containing compounds possess in most instances a greater flame-retarding action than do corresponding chlorine-containing compounds. However, the organic bromine-containing compounds differ widely among themselves as regards the flame retarding action of the bromine contained therein. Also, it is known that organic polymers differ widely in their burning characteristics and that the flame retarding action of organic bromine-containing compounds varies widely depending for the most part upon the organic bromine-containing compound and the organic polymer that are incorporated with one another. Accordingly, although it is known that organic bromides often exhibit a fire-retarding action, it remains a difficult and almost impossible problem to find compounds which are satisfactory to economically flameproof a given combustible organic material. For example, high impact, i.e. rubber toughened, styrene polymers are known to be highly combustible and difficult to render self-extinguishing.

It is a primary object of the invention to provide a method and agent or compounds for making self-extinguishing high impact styrene polymers. Another object is to provide self-extinguishing rubber modified styrene polymers. Other and related objects may appear from the following description of the invention.

According to the invention, self-extinguishing, high impact styrene polymers can readily be prepared by initimately incorporating a minor proportion preferably from 2 to 20 percent by weight of one or more dibromocarbene modified butadiene rubbery or elastomeric polymers with a major proportion, suitably from 98 to 80 percent by weight, of a vinylidene aromatic polymer as more fully hereinafter described.

The dibromocarbene adducts of butadiene polymers to be employed in the invention are the dibromocarbene adducts of rubbery butadiene polymers such as polybutadiene, random copolymers of butadiene and styrene, block copolymers of butadiene and styrene, or graft copolymers of styrene upon polybutadiene, or upon copolymers of styrene and butadiene. The dibromocarbene adducts of stereospecific polybutadiene and stereospecific copolymers of butadiene and styrene are preferred. The dibromocarbene adducts correspond to products wherein from about 5 to 20 percent of the ethylenic double bonds in the rubbery butadiene polymer have been reacted. The remaining ethylenic double bonds are in part consumed in the interpolymerization reactions involved in polymerizing, or otherwise intimately incorporating, the dibromocarbene modified butadiene polymer into or with the styrene polymer to produce the products of the invention.

The dibromocarbene modified butadiene polymer can be initimately incorporated with the styrene polymer by mechanically working the ingredients with one another at heat-plastifying temperatures of from 60° to 200° C. on compounding rolls, in a plastics extruder or in a Banbury Mixer. In a preferred embodiment, the compositions of the invention are prepared by dissolving the dibromocarbene modified butadiene polymer in a monomeric monovinyl aromatic compound such as styrene, vinyltoluene, vinylxylene, ethylvinylbenzene, chlorostyrene, dichlorostyrene, isopropylstyrene, tert.-butylstyrene, or a mixture of any two or more of such compounds, or a mixture of styrene and acrylonitrile or styrene and methyl methacrylate, and thereafter polymerizing the monomers in any usual way, e.g. by heating the solution in mass or bulk at polymerization temperatures between about 60° and 200° C. such as to maintain the polymerizing mass flowable as a viscous mass under pressure until polymerization of the monomer is substantially complete and thereafter recovering the polymer. Alternatively, the liquid solution can be agitated and prepolymerized to form a mixture containing from about 15 to 40 percent by weight of polymer, after which the prepolymerized material may be heated in mass in sealed containers to complete the polymerization, or the prepolymerized material may be dispersed as droplets, or globules in an aqueous medium and polymerization of the monomer completed in aqueous dispersion to obtain the product in the form of beads or rounded granules.

The following examples illustrate ways in which the principle of the invention has been applied but are not to be construed as limiting its scope.

EXAMPLE 1

(A) A charge of 300 ml. of tertiary butyl alcohol was placed in a two liter round bottom glass reaction vessel equipped with a reflux condenser, drying tube, dropping funnel, thermometer and stirrer. The alcohol was stirred while slowly adding 10 grams of finely divided potassium metal thereto at about the rate it was reacted. After reacting the potassium metal with the alcohol, excess alcohol was removed by distilling under reduced pressure. To the residue (potassium tertiary butoxide) was added 300 ml. of n-pentane. Thereafter a solution of 60 grams of stereospecific polybutadiene rubber having a Mooney number ML 1+4 of 35, dissolved in 800 ml. of cyclohexane was added. The resulting mixture was stirred and cooled to 0° C. Thereafter, a charge of 63 grams of bromoform was added dropwise while continuing to stir the mixture and maintain it at about 0° C. When all of the bromoform was added, the mixture was allowed to warm to room temperature (about 25° C.) and stirring was continued for one hour longer. Thereafter, was added to the mixture about 5 parts of 2,6-di-tert.-butyl-4-methylphenol per million parts of rubber product, after which the solution was poured into methyl alcohol with stirring. The precipitated product was separated by filtering and was washed and dried at a temperature of 50° C. under vacuum. The product was analyzed and found to contain 2.0 percent by weight of chemically combined bromine.

(B) A charge of 7 parts by weight of the dibromocarbene modified rubber prepared in part A above was placed in a two liter glass reaction vessel equipped with a reflux condenser and stirrer, together with 93 parts by weight of monomeric styrene. The mixture was stirred at room temperature for 18 hours to dissolve the brominated rubber in the styrene. To the solution was added 0.1 percent by weight of azobisisobutyronitrile as polymerization initiator. The mixture was stirred by rotating the stirrer at a rate of 60 revoluions per minute and was heated at 70° C. for a period of 5 hours. The mixture contained 30 percent by weight of polymer. The partially polymerized mixture was sealed in 1¼ inch diameter x 12 inch long glass tubes. The tubes were heated in an oil bath at a temperature of 110° C. for a period of 7 days to complete the polymerization. Thereafter, the polymer was recovered and was crushed to granular form. Portions of the granular polymer were compression molded at 150° C. to form flat plates 0.1 inch thick. Test pieces were cut from the molded plates. The test pieces were used to determine the tensile strength and percent elongation employing procedure similar to those described in ASTM D638–58T. Impact strength was determined using procedure similar to ASTM D256–56. Fire retardancy was determined using Underwriter's Test Subject 94. The product had the properties:

Tensile strength: 3,470 lbs./sq. in.
Elongation: 1.1 percent
Notched impact strength: 1.2 ft. lbs.
Melt index 230° C. at 3800 g./10 min.: 4.4
Fire retardance class: II

EXAMPLE 2

(A) In each of a series of experiments, (1) a stereospecific polybutadiene rubber similar to that employed in part A of Example I was reacted with bromoform to produce a dibromocarbene adduct rubber containing 2.6 percent by weight of bromine; (2) a rubbery block copolymer of styrene and butadiene was reacted with bromoform to produce a carbene adduct rubber containing 1.5 percent by weight of bromine; and (3) a random styrene-buadiene copolymer rubber was reacted with bromoform to produce a carbene adduct rubber containing 2.1 percent by weight of bromine.

(B) In each of a series of experiments, a charge of 7 parts by weight of one of the carbene adduct rubbers prepared in part A of this example was dissolved in 93 parts by weight of monomeric styrene and the solution polymerized to form a high impact styrene polymer product employing procedure similar to that employed in part B of Example 1. Table 1 identifies the experiments and the carbene adduct rubber employed. The table also gives the properties determined for the product.

TABLE 1

| Run No. | Dibromocarbene rubber adduct | | Bromine in product, percent | Tensile strength, lbs./sq. in. | Elongation, percent | Notched impact strength, ft. lbs. | Vicat heat distortion, ° C. | Melt index, gms. |
| --- | --- | --- | --- | --- | --- | --- | --- | --- |
| | Kind | Percent | | | | | | |
| 1 | "Diene" 35 | 7 | 2.6 | 3,600 | 5.2 | 1.3 | 96 | 5.9 |
| 2 | Block | 7 | 1.5 | 5,440 | 1.2 | 0.6 | 98 | 7.2 |
| 3 | Random | 7 | 2.1 | 4,720 | 3.6 | 1.1 | 102 | 4.4 |

¹ Grams in 10 min. at 230° C. and 3800 gm. piston weight. All the comparsions had a UL-94 SE II fire retardance rating.

We claim:
1. A high impact styrene polymer wherein the styrene polymer is prepared by dissolving from about 2 to about 20 weight percent of a stereospecific polybutadiene having from 5 to 20% of the ethylenic unsaturation in said polybutadiene reacted with and containing the dibromocarbene structure of the formula

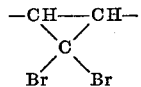

in styrene monomer and and polymerizing the styrene.
2. A high impact styrene polymer as claimed in claim 1, wherein the styrene polymer is polystyrene.
3. A high impact styrene polymer as claimed in claim 1, wherein the styrene polymer is a copolymer of a predominant amount of styrene, and a minor amount of acrylonitrile.

References Cited

UNITED STATES PATENTS 3,093,599   6/1963   Mueller-Tamm et al.   260—890
3,369,012   2/1968   Lundberg   260—94.7
3,483,272   12/1969   Hindersinn   260—890

OTHER REFERENCES

Willersinn et al., German application 1,260,138, printed Feb. 1, 1968.

SAMUEL H. BLECH, Primary Examiner

U.S. Cl. X.R.

260—85.1, 94.7 HA, 876 R, 876 B, 880 B, 890

PO-1050
(5/69)

UNITED STATES PATENT OFFICE
CERTIFICATE OF CORRECTION

Patent No.  3,639,522                    Dated   1 February 1972

Inventor(s)   Munisamappa Narayana, Henno Keskkula and Jerry E. Mason

It is certified that error appears in the above-identified patent and that said Letters Patent are hereby corrected as shown below:

Column 1, line 52, change "initi-" to -- inti- --.

Column 2, line 5, delete "initimately" and insert --intimately--.

Column 3, line 18, insert --a-- between the words "to" and "granular".

line 44, delete "buadiene" and insert --butadiene--.

Column 4, Table 1, change last heading from "Melt Index, gms." to --Melt$^1$ Index, gms.--.

line 28, delete "and".

Signed and sealed this 8th day of August 1972.

(SEAL)
Attest:

EDWARD M.FLETCHER,JR.          ROBERT GOTTSCHALK
Attesting Officer              Commissioner of Patent